United States Patent [19]

Mansmann et al.

[11] 3,821,070
[45] June 28, 1974

[54] PRODUCING NOVEL SILICON DIOXIDE FIBERS

[75] Inventors: Manfred Mansmann; Gerhard Winter, both of Krefled, Germany

[73] Assignee: Bayer Aktiengesellschaft, Leverkusen, Germany

[22] Filed: Aug. 9, 1971

[21] Appl. No.: 170,381

[30] Foreign Application Priority Data
Aug. 20, 1970 Germany............................ 2041321

[52] U.S. Cl................ 161/172, 161/181, 252/451, 264/DIG. 19, 264/63, 264/65
[51] Int. Cl.......................... D02g 3/00, C04b 35/64
[58] Field of Search ....... 264/63, DIG. 19; 252/451; 161/172, 181

[56] References Cited
UNITED STATES PATENTS

| | | | |
|---|---|---|---|
| 2,886,404 | 5/1959 | Teja | 264/DIG. 19 |
| 2,908,545 | 10/1969 | Teja | 264/DIG. 19 |
| 3,313,739 | 4/1967 | Acker | 252/451 |
| 3,395,117 | 7/1968 | Burzynski et al. | 252/451 |
| 3,428,719 | 2/1969 | Robertson | 264/DIG. 19 |
| 3,503,765 | 3/1970 | Blaze, Jr. | 264/DIG. 19 |
| 3,565,749 | 2/1971 | Wizon | 264/DIG. 19 |
| 3,652,749 | 3/1972 | Sobel et al. | 264/DIG. 19 |
| 3,678,144 | 7/1972 | Shoup | 264/63 |

*Primary Examiner*—Donald J. Arnold
*Attorney, Agent, or Firm*—Burgess, Dinklage & Sprung

[57] ABSTRACT

Silicon dioxide fibers are produced by dry spinning a hydrolysis solution containing poly-lower alkylene oxide, especially polyethylene oxide of high molecular weight, the product preferably being post-heat treated to a temperature of about 200° to 1,500°C at a controlled rate of heating either in an oxygen containing or in an inert atmosphere to produce novel fibers as characterized by physical properties and amorphous X-ray diagram. The hydrolysis is effected with less than about 3 moles of water per mole of alkoxy group contained in a tetraalkoxysilane or alkoxypolysiloxane and in the presence of a small amount of hydrochloric acid and a lower alkanol solubilizing agent.

11 Claims, No Drawings

PRODUCING NOVEL SILICON DIOXIDE FIBERS

This invention relates to the production of silicon dioxide fibers. As employed herein, silicon dioxide fibers are those which contain less than 1 percent of metal ions other than silicon, in contrast with the known A, C or E glass fibers which, in addition to about 54 to 73 percent by weight of $SiO_2$, contain up to about 46 percent by weight of other oxides.

Two different types of commercial $SiO_2$ fibers are known: firstly those which have been manufactured by spinning molten $SiO_2$, and secondly fibers which have been freed of foreign cations by leaching silicate glass fibers, for example alkali silicate glass fibers. $SiO_2$ fibers manufactured by melt spinning are suitable, because of their substantially better mechanical properties than those of the leached fibers, for use as extremely temperature-resistant reinforcement fibers for composite materials, a field which has constantly increased in importance in recent years. Admittedly, temperatures of 2,000°–2,100° C are required for melt spinning, with all the technical difficulties, and difficulties as regards to the container materials, resulting from such high temperatures. Accordingly, the prices of such fibers are relatively high.

While the working temperature can be greatly reduced by spinning silicate melts, an involved leaching process becomes necessary, from which a mechanically weak, porous $SiO_2$ fiber results. At shorter leaching times, the fiber still contains relatively high proportions of cations, which restrict its utility at higher temperatures as compared to the purer $SiO_2$ fibers. Leached $SiO_2$ fibers have in particular found use as a thermal insulating material. It is customary to describe $SiO_2$ fibers made by melt spinning pure $SiO_2$ as quartz fibers, even if they consist of quartz glass, characterized by their amorphous X-ray diagram, and not of the crystalline quartz modification. Leached $SiO_2$ fibers are known as high silica fibers.

French Pat. specification No. 1,364,238 describes a way of manufacturing $SiO_2$ fibers, in which sodium silicate is homogeneously dissolved in a cellulose xanthate solution, and then, during conventional viscose spinning in a precipitation bath, $SiO_2$ separates out in a very finely divided form in the cellulose fiber. In order to obtain an $SiO_2$ filament from this spun fiber, the cellulose must be removed oxidatively at about 900° C, whereby it is destroyed. The amount of cellulose which is required for the fiber formation and which must correspondingly also be burnt off again is considerable. The cited patent specification claims a ratio of the glass-forming compound, such as, for example, sodium silicate, to cellulose of 0.2 to 2 parts of glass-forming agent per 1 part of cellulose. The example given describes a spinning solution which contains equal parts of sodium silicate and cellulose.

Further details of this process are to be found in J. Polym. Science, Pt. C. No. 19, 267 (1967). According to this, the best tensile strengths result if during the oxidation treatment the fibers are heated under tension and there are not formed any $SiO_2$ modification which is crystalline according to X-ray examination. Under these conditions, the maximum value of the tensile strengths obtained was 105 kp/mm$^2$.

Particularly in the case of larger amounts of fibers it is necessary to carry out the formation of $SiO_2$ fibers at higher temperatures in two stages. Firstly, the cellulose component is decomposed to carbon in a reducing atmosphere, and subsequently the removal of the carbon and the sintering of the $SiO_2$ fibers, which during the removal of the carbon are produced in a very porous form, is effected in an oxidizing atmosphere. Without this two-stage procedure, temperature control is not possible, since during the direct oxidative removal of the cellulose flames appear and the fibers burn away.

The difficulties in manufacture which have been mentioned and the overall unsatisfactory mechanical properties of the porous $SiO_2$ fibers obtained in this manner hinder the practical use of this process.

It is accordingly an object of the present invention to provide a process for the production of silicon dioxide fibers of superior physical properties in a relatively simple, inexpensive manner.

This and other objects and advantages are realized in accordance with the present inveniton wherein an $SiO_2$-containing solution is extruded to form fibers. The solution contains poly-lower alkylene oxide, especially polyethylene oxide and the resulting fibers may be heat treated at a temperature up to about 1,500° C. The solution which is extruded is produced by hydrolyzing a tetraalkoxysilane or an alkoxypolysiloxane with at least the amount of water stoichiometrically required for complete hydrolysis of the alkoxy groups, i.e., at least 2 moles of water in the case of the tetraalkoxysilane.

Using the process according to the invention, it is surprisingly possible to obtain $SiO_2$ fibers with strength properties such as have hitherto only been known for quartz glass fibers drawn from the melt. Because of their high tensile strength, they can be employed as heat-resistant reinforcing fibers. Because of their cheap and technically uncomplicated process of manufacture, they can furthermore also be employed as a cheap high temperature insulating material, as a filter for hot and/or corrosive gases or liquids, as a catalyst or as a catalyst carrier material. In addition, the process according to the invention made it possible for the first time to manufacture silica gel filaments of high tensile strength and low Young's modulus.

Both tetraalkoxysilanes (silicic acid tetraalkyl esters) and alkoxypolysiloxanes have been known for a long time. The incomplete hydrolysis of the tetraalkoxysilanes produces alkoxypolysiloxanes, these being compounds in which a greater or lesser number of Si atoms are linked to one another via oxygen bridges. For the manufacture of the alkoxypolysiloxanes, the partial hydrolysis of the tetraalkoxysilanes, which is usually catalytically accelerated by adding a small amount of acid in the presence of small amounts of alcohol as solubilizing agent, is the most customary method. The reaction of $SiCl_4$ and alcohol with the requisite quantity of water is also employed rather frequently. Further methods of manufacture are, for example, given in "Chemie and Technologie der Silicone" ("Chemistry and Technology of the Silicones") by W. Noll, Verlag Chemie, Weinheim 1968, pages 559 – 563.

The alkoxypolysiloxanes obtained according to the various methods can be used in the same manner for the present process according to the invention.

The degree of condensation of the alkoxypolysiloxanes depends on the proportion of water molecules which have reacted per silicon atom. In the case of tetraalkoxysilanes being used as the starting material, the equation can generally be formulated as follows:

$$p\,\text{Si}(\text{OR})_4 + pn\,\text{H}_2\text{O} \rightarrow (\text{Si}(\text{OR})_{4-2n}\text{O}_n)_p + p\,2n\,\text{ROH}$$

$p$ = degree of condensation
$n$ = 0 to 2.

Up to one water molecule per tetraalkoxysilane molecule, chain formation predominantly occurs, whereas above one $H_2O$ molecule per Si atom crosslinking increasingly occurs. At an $H_2O$ : Si ratio above 2, i.e., at an $H_2O$:alkoxy ratio above 0.5, the hydrolysis to form $SiO_2$ is complete. The hydrolysis product which is produced under these conditions, remains in colloidal solution. These solutions are completely clear and show no turbidity whatsoever, not even the known opalescence of ordinary, commercially available silica sols. The colloidal $SiO_2$ sol solutions formed by complete hydrolysis are distinguished by remarkable stability. Thus, for example, an $SiO_2$ sol manufactured by hydrolysis of tetraethyl silicate with 3 moles of $H_2O$ per mole of Si at 30° C, remains completely unchanged over the course of 200 hours. As the $H_2O$ : Si ratio rises, the stability slowly decreases. An $SiO_2$ sol obtained by hydrolysis of tetraethyl silicate with 4 moles of $H_2O$ per mole of Si shows an increase in its viscosity after approximately 150 hours at 30° C. The same sol can be heated to the boil for 4 hours without its viscosity changing. $H_2O$ : Si molar ratios of 2 to about 12, i.e., $H_2O$:alkoxy ratios of 0.5 to about 3, are in general used to manufacture the spinning solutions according to the invention. $H_2O$ : Si molar ratios of between 3 and 5, i.e., $H_2O$ : alkoxy ratios of 0.75 to 1.25, are particularly preferred.

Where the starting material is an alkoxypolysiloxane instead of a tetraalkoxysilane, the oxygen atoms already bonded in the polysiloxane, and each linking 2 silicon atoms, have to be deducted in calculating the amount of water required for the hydrolysis when based on silicon so that with such materials it is easier to calculate the $H_2O$:alkoxy ratio.

As alkoxy groups, those from the series of the methoxy, ethoxy, propoxy and butoxy groups are used, individually or as mixtures. The methoxy and ethoxy compounds are particularly preferred, that is to say roughly the following compounds: tetramethoxysilane (tetramethyl silicate), tetraethoxysilane (tetraethyl silicate), hexamethoxydisiloxane, hexaethoxydisioxane, octamethoxytrisiloxane, octaethoxytrisiloxane, decamethoxytetrasiloxane, decaethoxytetrasiloxane, dodecamethoxypentasiloxane, dodecaethoxypentasiloxane and the like up to the polymethoxypolysiloxane and polyethoxypolysiloxane with an alkoxy : Si ratio of between 2.33 and 1 or even below.

The alcohol which is usually added in small amounts as a solubilizing agent in the hydrolysis of the tetraalkoxysilanes or alkoxypolysiloxanes is chosen from the group of the lower saturated aliphatic alcohols, e.g. $C_{1-4}$ alkanols. Methanol and ethanol are preferably used as solubilizing agents. In doing so, the alcohol used as the solubilizing agent does not have to be the same as the alcohol on which the alkoxy groups of the silane or siloxane employed are based.

The concentration of silicon in the spinning solutions, expressed in per cent of $SiO_2$ by weight, can be varied within wide limits, for example between about 5 and 40 percent of $SiO_2$. In general concentrations between about 15 and 30 percent of $SiO_2$ are preferred. In the context of the present invention the term poly-lower alkylene oxide is used for the polymerization products of ethylene oxide, propylene oxide and butylene oxide, either individually or in mixture resulting in copolymerized products. Polyethylene oxide and polyethylene oxide copolymerized with up to about 50 percent by weight, are preferred because of the ease of commercial availability and the better solubility properties. The invention will be described as follows with reference to polyethylene oxide, but it should be taken as example and not as limitation.

The concentration of the polyethylene oxide is always below the $SiO_2$ concentration of the spinning solution and depends greatly on the degree of polymerization of the polyethylene oxide. Generally speaking, the concentration of polyethylene oxide will be from about 0.001 to 5 percent by weight of the spinning solution. The concentration can be lower as the degree of polymerization is higher. Degrees of polymerization of above 2,000, especially above 5,000, are preferred, and in order to keep the concentration of polyethylene oxide as low as possible, polyethylene oxide grades with degrees of polymerization of about 100,000 or above are employed. While polyethylene oxide having a degree of polymerization of about 450 (Polywachs 20,000 of Messrs. Chem. Werke Huls AG) does not give a spinnable solution even at a concentration of 20 percent ($SiO_2$ content 14,5 percent), a spinnable solution is obtained extremely simply with polyethylene oxides of higher degrees of polymerization even at concentrations of below 2 percent. In the case of polyethylene oxide with degrees of polymerization of about 100,000 or above, additions of less than 0.5 percent already suffice to obtain outstandingly spinnable solutions and are therefore preferred.

To hydrolyze the Si-O-C bonds, the known catalysts, especially strong acids with a pK-value of below 2 (compare Handbook of Chemistry and Physics, 46th Ed., 1965 – 1966, pages D–76 and thereafter) are usually added to the reaction solution. Concentrated hydrochloric acid is preferably employed. In general, minimal amounts less than 1 percent, for example 0.1 percent or less, of concentrated hydrochloric acid relative to the total solution suffice.

If an alcohol is used as the solubilizing agent for the hydrolysis reaction, it can be used in up to high concentrations. However, its proportion in the spinning solution will generally be kept low for economic reasons. Typical concentration values are generally between about 10 and 40 percent by weight.

The manufacture of the spinning solution is very simple. In detail, the following procedure can be adopted: firstly, a colloidal $SiO_2$ solution is manufactured by hydrolysis of a tetraalkoxysilane or of an alkoxypolysiloxane, for example by allowing the silane or polysiloxane to run into the reaction vessel simultaneously with the water, the solubilizing agent and the catalyst which may be used, while stirring. The reaction vessel is appropriately heated to temperatures between about 50° C and approximately the boiling point of the lowest-boiling constituent, say the added alcohol. The exothermic hydrolysis reaction can be kept under control very simply through the speed of addition. If appropriate, especially in the case of polysiloxanes, for which the amount of heat liberated during hydrolysis is less, the mixture can additionally be heated externally. After completion of the hydrolysis, the mixture is stirred for some time longer. Periods of subsequent stirring of between about 10 minutes and 2 hours in general suffice. To reduce the effort of metering, the water, solubilizing agent and catalyst are usually separately mixed in the desired ratio and fed as a mixture to the reaction vessel. However, the colloidal SiO₂ solution can also be manufactured by initially introducing the water/solubilizing agent/catalyst mixture into the reactor. The silane or polysiloxane is then allowed to run in while stirring and, if appropriate, heating to a temperature up to that of the lowest-boiling constituent. Initially introducing the silane or the polysiloxane into the reactor is less preferred, since, or running in the water/solubilizing agent/catalyst mixture, precipitates can occasionally form, which can no longer be dissolved or can barely be dissolved, in the desired amount of water.

The colloidal SiO₂ solution manufactured by one of the procedures described above is then mixed with an aqueous solution of polyethylene oxide, and a period of stirring of 10 minutes to about 2 hours in most cases suffices for homogenization. After fine filtration, this solution is outstandingly spinnable.

Another, particularly simple method of manufacture of the spinning solution also gives excellent spinning performance. For this, the tetraalkoxysilane or the alkoxypolysiloxane is mixed with the solubilizing agent and the catalyst and heated to the requisite reaction temperature, generally between about 50° C and the boiling point of the solubilizing agent. Hydrolysis is then carried out directly, while stirring, with the aqueous polyethylene oxide solution. The concentration of the polyethylene oxide solution is so chosen that the spinning solution contains the requisite concentration of polyethylene oxide and that the amount of water corresponds to the ratio desired for the hydrolysis. After a short further period of stirring, the spinning solutions can be used.

The viscosity of the SiO₂ spinning solution is quite considerably lower than that of known spinning solutions, such as are, for example, used for the manufacture of organic synthetic fibers. Typical values, measured at 30° C in a Rotovisko at a shear gradient of D = 400 sec⁻¹, lie in the range of 10 to 1,000 cP. The solutions are therefore particularly easy to filter, easy to degas and easy to pump through feed pipelines. The pressures required for the spinning process are accordingly considerably lower than for the synthetic fiber processes which are otherwise customary.

Possible spinning processes are wet spinning processes and dry spinning processes. In the case of the wet spinning process, the spinning solutions are spun into a suitable precipitation bath, where the sol-gel transformation takes place. To manufacture staple fibers, dry spinning can be carried out in a centrifugal spinning machine. However, a conventional dry spinning process is preferably employed. For this, the solutions are spun at room temperature or slightly elevated temperature from a spinning head provided with a plurality of orifices. The filaments pass through a heated spinning column, through which air flows in the same direction as the filaments. At the end of the spinning column the fibers are wound on a drum. Fiber diameters between 1 and 50 μ are obtainable by varying the take-up speed, and/or by varying the concentration of the spinning solution. The fiber cross-sections are round.

The pure white silica gel fibers obtained in this manner, in the freshly collected state, are products which can already put to practical use, since they possess good tensile strengths. Their tensile strengths are in general between about 30 and 50 kp/mm², and their Young's-moduli are between about 1,000 and 1,600 kp/mm². Furthermore, these fibers are stable to acid; for example, they can be boiled for 24 hours in 1 N hydrochloric acid without being damaged. Their complete non-inflammability must be singled out as a particularly important property of these fibers.

Analytically, the freshly collected fibers show an SiO₂ content which is generally between about 70 and 80 percent. The difference is attributable to the different degrees of drying of fibers resulting from different column temperatures and different fiber diameters. In general, however, the SiO₂ content is about 76 percent. Additionally, the silica gel fibers still contain water and alcohol. The anions of the acid used as the catalyst for the hydrolysis are also detectable. Determination of the analytical content of carbon, hydrogen, water and chlorine (from the hydrochloric acid used as the catalyst) showed the following values for a typical freshly collected silica gel fiber sample, manufactured analogously to Example 5: 7.05 percent of carbon, 3.28 percent of total hydrogen, 15.4 percent of total water and 575 ppm of chlorine. It can be assumed that the carbon is present with a part of the hydrogen in the form of SiOR groups (R = alkyl radical), and the water is present in the form of SiOH groups.

After their manufacture, the silica gel filaments can be subjected to a heat treatment, which normally takes place in air. If necessary, inert gas, for example nitrogen or a flue gas, for example from the direct combustion of solid, liquid or gaseous fuels, can also be used. In the latter case, the gases are appropriately passed in such a way that the hot gases run in counter-current to the fibers, so that the fresh fibers are brought into contact with gas which has already cooled.

In the course of the heat treatment, a loss in weight and a shrinkage in length of the fibers occurs. A typical course of the weight loss is shown in the table below, together with the course of the shrinkage in length. The values determined for the tensile strength and Young's-modulus are also shown. The values in the table apply to heating rates of about 10° to 200° C/hour up to 400° C, and of about 100° to 1,000° C/hour above 400° C, in air.

Table

| Temp. °C | Loss in weight % | Shrinkage % | Tensile strength kp/mm² | Young's-modulus kp/mm² |
|---|---|---|---|---|
| 150 | 8 | 2 | 30–50 | 1000–1600 |
| 200 | 16 | 4.5 | 30–50 | 1200–1700 |
| 300 | 22 | 6 | 40–60 | 1400–2000 |
| 400 | 24 | 7 | 45–65 | 2000–2500 |
| 500 | 24 | 8 | 50–70 | 3200–3600 |
| 600 | 24 | 9 | 60–80 | 4000–5000 |
| 800 | 24 | 11 | 70–90 | 6500–7300 |
| 1000 | 24 | 12.5 | 90–120 | 6800–7300 |

Above 1,000° C to about 1,500° C, the further change in the properties is insignificant. Above 1,500° C, the fibers begin to sinter strongly. For maximum tensile strength and Young's-modulus it therefore suffices to heat the fibers to about 1,000° C.

If the heating is carried out under an inert gas, SiO₂ fibers which are colored black and contain carbon are obtained, this being caused by the cracking of the alkoxy groups contained in the filament. The mechanical properties of the fibers are not harmed thereby. Both in the case of the pure white SiO₂ fibers and of the SiO₂ containing carbon, X-ray analyses up to the higest temperatures show the presence of an amorphous glass phase without sign of crystallization, totally in contrast to fibers from silica sol, where $SiO_2$ is present in the crystobalite modification after the heat treatment.

If, during the heat treatment in air in the range of splitting-off of the alkoxy groups, say below 400° C, too high a rate of heating is selected, fibers which are more or less dark in color result, since in that case the alkoxy groups are partly thermally cracked in the filament before they are split off. A similar phenomenon is also observed if, as a result of too high a packing density of the fibers, diffusion of atmospheric oxygen to fibers lying nearer the interior is rendered difficult. These disadvantages can be avoided in a simple manner by reducing the rate of heating and/or by a higher throughput of air through the packed fibers.

After splitting off the alkoxy groups, the temperature can be raised very rapidly without a harmful influence on the quality of the fibers. Suitable rates of heating have proved to be rates of between 10° and 200° C/hour up to about 400° C and rates of between 100° and about 1,000° C/hour above 400° C. After reaching the final temperature, the fibers can be directly removed from the hot oven as a result of their excellent resistance to temperature change. In the case of fibers which are to be used for thermal insulation, the fresh fibers can also be directly introduced into a hot oven and again removed after a few minutes. In that case the fibers are more or less dark in color and their strength is somewhat less than in the case of a carefully controlled rate of heating, but this is of no importance for the envisaged end use.

The tensile strength of the $SiO_2$ fibers manufactured according to the process of the invention can be significantly improved further if, after the heat treatment (final temperature: 900° – 1,000° C), the fibers are subjected to an etching treatment with hydrofluoric acid or alkalies such as alkali metal hydroxides. Thus, for example, the fibers obtained according to Example 5, having a tensile strength of 105 kp/mm$^2$, were treated for one hour with 34 percent strength hydrofluoric acid at 25° C, and subsequently the tensile strength was again determined. As a result of the treatment the tensile strength had risen to 160 kp/mm$^2$, the Young's-modulus being unchanged.

While the $SiO_2$ fibers according to the invention, which have been subjected to a heat treatment in air at, say, above 800° C, do not differ, either in their physical data or in their chemical behavior, for example amorphous X-ray diagram, density, modulus of elasticity, analytical composition, acid resistance and the like, from quartz fibers which have been manufactured by the far more expensive melt process, the fibers treated under an inert gas at a temperature of above 800° C represent a new type of fiber, which is characterized through its tensile strength of more than about 70 kp/mm$^2$, its Young's-modulus of more than about 6,000 kp/mm$^2$, its specific surface area of less than 1 m$^2$/g, its chemical composition of $SiO_2$ and carbon, with the carbon content being between about 0.1 and 15 percent, and its amorphous structure according to X-ray examination.

Such $SiO_2$ fibers containing carbon are, for example, useful for the manufacture of thin boron fibers. Hitherto, it was necessary for this purpose to provide $SiO_2$ fibers, in a first reaction step, with a carbon coating, before boron could be deposited on the fibers which were then resistance-heated (because of its high specific gravity tungsten wire is only suitable for the manufacture of thick boron filaments of low flexibility). Using the $SiO_2$ fibers containing carbon, according to the invention, the first reaction step can be omitted, since the fibers are suitable for direct resistance heating.

However, the silica gel fibers obtained in the first step according to the process of the invention, that is to say the freshly collected fibers or fibers having had a thermal treatment below 800° C, especially below 400° C, have also not hitherto been described in the literature. The combination of high tensile strength with relatively low Young's-modulus, which approaches that of organic fibers, complete non-inflammability, pure white color, maximum fastness to light, chemical resistance to boiling acids and dilute alkalies and simultaneous presence of numerous reactive surface groups makes them an extremely interesting fiber also for the textile field of use, for example for curtains, carpets, upholstery fabrics, fire-proof clothing and the like. Hitherto, glass fibers were the only non-inflammable fiber available for the textile field. However, the glass structure also fixes its Young's-modulus at 7,300 kp/mm$^2$, which is hence undesirably high for textile use, since the textiles manufactured therefrom are relatively stiff. In practice, attempts are made to counter this disadvantage by using extremely thin, about 2 – 3 $\mu$ thick, fibers; however, these fibers are not very economical because of the low space-time yield. Glass fibers furthermore suffer from the disadvantage that because of their extremely smooth surface and the absence of reactive surface groups they are very difficult to surface dye. In comparison with glass fibers of the same thickness, the silica gel fibers according to the invention, for example heat-treated at up to about 200° C, are approximately five times as flexible. Hence the manufacture of extremely thin silica gel fibers, which is possible without difficulty according to the process of the invention, is not necessary.

The silica gel fibers according to the invention are characterized by the following typical data: maximum heat treatment below about 800° C, especially below about 400° C; structure amorphous to X-rays; chemical composition between about 70 and 100 percent of $SiO_2$, between about 20 and 0 percent of $H_2O$, as determined by heating the fibers in nitrogen atmosphere up to 600° C and measuring the amount of water evolved by conventional means, between about 20 and 0 percent of alkoxy groups, expecially methoxy and ethoxy groups, and less than about 2 percent of acid radicals other than the silicate group; density between about 1.70 and 2.17; Young's-modulus below about 6,000 kp/mm$^2$, preferably below about 2,500 kp/mm$^2$; tensile strength between about 30 and 80 kp/mm$^2$, specific surface area of less than 1 m$^2$/g.

For use as a high temperature insulating material it suffices to heat the silica gel fibers up to a maximum of about 400° C, since at this temperature the volatile constituents have already been split off and the principal shrinkage has already occurred.

In the text which follows, the present invention is illustrated with the aid of further examples, Examples 1 – 3 describing fibers from silica sol which are contrasted, in Examples 4 – 8, with the fibers according to the invention.

COMPARISON EXAMPLE 1

Commercial alkali-stabilized silica sol — 30 percent by weight of $SiO_2$; 0.16 percent of Na; density 1.19 — was stirred at room temperature, for 10 minutes, with a suspension of 0.5 g of polyethylene oxide powder, having a degree of polymerization of about 136,400, in 9.5 g of methanol. Thereafter, 0.7 g of ethylenediamine was added and the mixture was homogenized for a further 20 minutes while stirring. After filtration, the solution could be spun. It contained 27 percent of $SiO_2$ and 0.5 percent of polyethylene oxide.

The solution, adjusted to a temperature of 25° C, was spun through an orifice of 0.5 mm diameter into a column which was heated to 120° C and flushed with dry air of room temperature passing in the same direction as the filaments. At the end of the column, the filaments were wound up on a rotating drum, at a speed of 60 m/min.

Thereafter, the fibers were removed from the drum, placed parallelly in a silica tube and heated in air flow rate: 100 l/h to 300° C at a rate of heating of 40° C/hour and between 300° and 1,000° C at a rate of heating of 500° C/hour. The loss in weight was 11.5 percent. According to the X-ray diagram, the $SiO_2$ fibers which have been heated to 1,000° C are polycrystalline; $SiO_2$ is present in the cristobalite modification.

After the heat treatment, white flexible fibers are obtained, of which the tensile strength was determined as 33 kp/mm² and the Young's-modulus as 3,800 kp/mm². A fiber sample withdrawn from the oven at 300° C showed a tensile strength of 15 kp/mm² and a Young's-modulus of 1,500 kp/mm².

COMPARISON EXAMPLE 2

200 ml of 30 percent strength $SiO_2$ (as in Example 1), 200 ml of $H_2O$ and 65 g of 2.1 percent strength aqueous polyethylene oxide solution (as in Example 1) were mixed and $NH_3$ gas was passed in until pH = 10.1 was reached. The spinning solution which contained 14.35 percent of $SiO_2$ and 0.275 percent of polyethylene oxide, was filtered under pressure and spun in a column heated to 80° C. The filaments were wound on a rotating drum and thereby drawn down to a diameter of approximately 5 μ. Thereafter, the filaments were pre-dried at 105° C, placed for 10 minutes in an oven heated to 900° and for a further 3 minutes in an oven heated to 1,175° C, and thereafter cooled. After this treatment, the filaments showed a tensile strength of 41 kp/mm² and a Young's-modulus of 3,950 kp/mm². They consisted of small cristobalite crystals of size 500 A.

COMPARISON EXAMPLE 3

A silica organosol was manufactured in the following manner, in accordance with the process of German Published Pat. specification No. 1,926,908:

A waterglass solution containing 20.2 percent of $SiO_2$ and 5.9 percent of $Na_2O$ was allowed to run into a receiver containing 300 g of 25 percent strength sulfuric acid, with vigorous mixing and cooling, over the course of 20 minutes until a pH value of 1.5 was reached. 987 g of a clear silica sol were produced. A mixture of 215 g of dimethylsulfoxide and 247 g of dimethylacetamide was added to this sol. After 3 days, the $Na_2SO_4$ which had precipitated was separated off. Thereafter, the sol was concentrated at 38 mm Hg in a rotary evaporator and while doing so further $Na_2SO_4$ was filtered off three times. The $SiO_2$ content of the finished organosol was 16.7 percent.

20 g of methanol and 20 g of 2 percent strength aqueous polyethylene oxide solution (as in Example 1) were added to 50 g of this sol and the mixture was homogenized for 10 minutes. The finished spinning solution contained 9.3 percent of $SiO_2$ and 0.45 percent of polyethylene oxide.

The solution, adjusted to a temperature of 30° C, was spun through an orifice of 0.4 mm into a column heated to 180° C and was wound up at a speed of 100 m/min.

The heat treatment of the white, flexible filaments was carried out in air. The fibers were heated to 300° C over the course of one hour and left thereat for 1 hour. Thereafter, they were heated to 1,000° C over 4 hours and immediately withdrawn from the oven. The weight loss was 31 percent. According to X-ray examination of the fibers, they consisted of cristobalite.

A fiber sample withdrawn at 300° C showed slight brown discoloration and the following mechanical properties: tensile strength: 22 kp/mm², Young's-modulus: 2,200 kp/mm². After the heat treatment at 1,000° C the fibers were white; their tensile strength was 20 kp/mm² and their Young's-modulus was 4,000 kp/mm².

EXAMPLE 4

200 g of tetraethyl silicate together with 90 g of a solution of 63.2 percent of water, 36.6 percent of methanol and 0.2 percent of concentrated hydrochloric acid were warmed to 50° C while stirring, whereupon exothermic hydrolysis took place, with the temperature rising to 70° C. After 10 minutes, 128 g of the hydrolysis solution were mixed, at 50° C, with 18 g of a 2 percent strength aqueous polyethylene oxide solution (as in Example 1), and homogenized while stirring, over the course of 10 minutes. The $SiO_2$ content in the finished spinning solution was 17.5 percent and the polyethylene oxide content 0.25 percent.

Spinning was carried out analogously to Example 3, at a column temperature of 120° C. Measurement of the tensile strength and of the Young's-modulus on the freshly wound-up filaments gave a value of 24 and 1,200 kp/mm², respectively.

The filaments were dried overnight at 140° C and subsequently heated to 200° C over the course of 6 hours. The tensile strength was then about 30 kp/mm², and the Young's-modulus 1,600 kp/mm².

The further heat treatment of the filaments was carried out under nitrogen. The heating rate between 200° and 400° C was 60° C/hour and between 400° and 1,000° C was 300° C/hour. Black, flexible $SiO_2$ fibers resulted, which were completely amorphous on X-ray examination. The carbon content of these fibers was 1.5 percent by weight. Their tensile strength was 94 kp/mm² and their Young's-modulus was 7,000 kp/mm².

EXAMPLE 5

104 g of tetraethyl silicate were mixed with 30 g of methanol and 4 drops of concentrated hydrochloric acid were added. 37 g of a 2 percent strength polyethylene oxide solution (as in Example 1) were added to the former solution and the mixture was warmed slightly, whereupon the hydrolysis reaction took place, with the temperature rising to 50° C. After 10 minutes homogenization, the mixture was cooled to room temperature and stirred for a further 10 minutes. The spinning solution contained 17.6 percent of $SiO_2$ and 0.43 percent of polyethylene oxide.

The solution was spun as described in Example 4, with a draw-off speed of 125 m/min, to give filaments of 10 $\mu$ diameter. Determination of the mechanical properties of these filaments gave 35 kp/mm$^2$ for the tensile strength and 900 kp/mm$^2$ for the Young's-modulus.

The freshly collected fibers were heated for 2 hours at 240° C in air, subsequently heated to 500° C over the course of 25 minutes, again in air, and left for one hour at 500° C. The weight loss was 24.2 percent. Thereafter, the white, flexible fibers had a tensile strength of 71 kp/mm$^2$ and a Young's-modulus of 3,400 kp/mm$^2$. Finally, the fibers were heated to 1,000° C in air over the course of a further 45 minutes, and immediately after reaching the temperature were taken out of the oven. The measurement of the tensile strength and Young's-modulus now gave 105 kp/mm$^2$ and 7,200 kp/mm$^2$ respectively. No further weight loss had occurred between 500° and 1,000° C. The X-ray analysis showed a completely amorphous structure.

EXAMPLE 6

The spinning solution was manufactured as described in Example 5, except that 30 g of ethanol were added as the solubilizing agent, in place of methanol. Spinning took place as in Example 4, with a wind-up speed of 165 m/min. The tensile strength of the freshly wound-up filament was 32 kp/mm$^2$, and the Young's-modulus was 1,000 kp/mm$^2$. The fibers had a round cross-section of 14 $\mu$ diameter.

A part of the fibers was dried overnight at 120° C and subsequently heated in air to 400° C at a heating rate of 60° C/hour and then to 1,000° C at a heating rate of 500° C/hour. Thereafter, the fibers showed a completely amorphous structure on examination by X-rays. Their tensile strength was found to be 112 kp/mm$^2$ and their Young's-modulus was found to be 7,000 kp/mm$^2$. A fiber sample withdrawn at 300° C gave a tensile strength of 45 kp/mm$^2$ and a Young's-modulus of 2,000 kp/mm$^2$.

EXAMPLE 7

Ethoxypolysiloxane was manufactured from $SiCl_4$, alcohol and water in accordance with the following overall equation

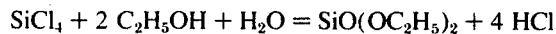

$$SiCl_4 + 2\ C_2H_5OH + H_2O = SiO(OC_2H_5)_2 + 4\ HCl$$

For this purpose, 340 g of $SiCl_4$ and 36 g of water in the form of 450 g of ethanol containing 8 percent of water were simultaneously run into a flask heated to 55° C, while stirring, and thereafter the greater part of the HCl was flushed out with nitrogen for 1 hour at the same temperature. The excess ethanol was distilled off at normal pressure. The yield of ethoxypolysiloxane was 266 g and the $SiO_2$ content of the substance was 44.7 percent.

A spinning solution containing 22.3 percent of $SiO_2$ and 0.40 percent of polyethylene oxide was produced by homogenizing a mixture of 50 g of ethoxypolysiloxane and 30 g of methanol with 20 g of a 2 percent strength aqueous polyethylene oxide solution (as in Example 1) for 15 minutes at 40° C, while stirring. The solution was spun as in Example 4, but the column temperature was 190° C and the wind-up speed was 120 m/min. The tensile strength of the freshly collected fibers was found to be 51 kp/mm$^2$ and their Young's-modulus was found to be 1,400 kp/mm$^2$.

After the fibers had been dried overnight at 120° C, they were heated in air to 300° C over the course of 3 hours. Thereafter, their tensile strength was 65 kp/mm$^2$ and their Young's-modulus was 2,000 kp/mm$^2$.

EXAMPLE 8

A methoxypolysiloxane mixture was manufactured by simultaneous dropwise addition, over the course of 30 minutes, of 340 g of $SiCl_4$ and of a mixture of 171 g of methanol and 30.8 g of water to a stirred and cooled receiver containing 85 g of tetramethyl silicate. Thereafter, the mixture was boiled for 1 hour under reflux and then separated by distillation from excess methanol and from 39 g of unreacted tetramethyl silicate. A methoxypolysiloxane mixture containing 50.9 percent of $SiO_2$ was obtained. 70 g of this polysiloxane mixture were stirred with 14 g of methanol and 25 g of 2 percent strength aqueous polyethylene oxide solution (as in Example 1) for 30 minutes at 50° C, thereafter a further 30 g of water were added, and the mixture was homogenized for a further 10 minutes.

This solution, containing 25.6 percent of $SiO_2$ and 0.36 percent of polyethylene oxide, was spun as in Example 4, at a column temperature of 200° C and a wind-up speed of 85 m/min. The tensile strength of the freshly wound-up filaments was 35 kp/mm$^2$ and their Young's-modulus was 1,600 kp/mm$^2$.

The fibers of Examples 4 to 8 can be spun into threads of yarns and woven into textile fabrics in conventional manner, the threads, yarns and fabrics being flameproof. Either the yarns or the fabrics made therefrom can be bonded to form insulating layers for wrapping pipes, covering surfaces, and the like, or they can be placed in molds after which resins such as polyesters or epoxy are poured in and set into reinforced structures.

It will be appreciated that the instant specification and examples are set forth by way of illustration and not limitation and that various modifications and changes may be made without departing from the spirit and scope of the present invention.

What is claimed is:

1. In the production of $SiO_2$ fibers by dry spinning a solution containing $SiO_2$, the improvement which comprises using a solution of a siloxane selected from the group consisting of tetraalkoxysilane and alkoxypolysiloxane which has been hydrolyzed in the presence of a strong acid having a pK of less than about 2 with at least the amount of water stoichiometrically required for complete hydrolysis of the alkoxy groups, said solution containing about 5 to 40 percent by weight of $SiO_2$, said solution having dissolved therein about 0.001 to 5 percent by weight of a poly-lower alkylene oxide of a degree of polymerization of at least about 2,000, and about 10 to 40 percent by weight of an alkanol, said solution having a viscosity of about 10 to 1,000 centipoise, and post-heat treating the fibers to a temperature of about 200° to 1,500° C in an oxygen-containing or inert atmosphere.

2. A process according to claim 1, wherein the alkoxy groups of said siloxane are methyl or ethyl groups.

3. A process according to claim 1, wherein the hydrolysis of said tetraalkoxysilane or of said alkoxypolysiloxane is effected in the presence of said alkanol which contains, up to four carbon atoms.

4. A process according to claim 3, wherein the hydrolysis is effected with less than about 3 moles of water per mole of alkoxy group.

5. A process according to claim 1, wherein the heat treatment is carried out at a rate of heating of about 10° to 200° C/hour up to 400° C and of about 100° – 1,000° C/hour above 400° C.

6. A process according to claim 1, wherein the heat treatment is carried out under an inert gas.

7. A process according to claim 5, wherein the poly-lower alkylene oxide has a degree of polymerization of at least about 100,000, the hydrolysis of the alkoxy groups of said siloxane is effected with less than about 3 moles of water per mole of alkoxy group in the presence of about 10 to 40 percent of methanol or ethanol and less than about 0.1 percent of hydrochloric acid, and the solution being extruded contains about 15 to 30 percent of $SiO_2$, all percentages being by weight of the solutions.

8. An amorphous silicon dioxide fiber having a tensile strength in excess of about 70 kp/mm$^2$, a Young's-modulus of more than about 6,000 kp/mm$^2$, a specific surface area of less than 1 m$^2$/g, and consisting essentially of only silicon dioxide and of between about 0.1 and 15 percent by weight of carbon.

9. An amorphous silica gel fiber having a tensile strength of about 30 to 80 kp/mm$^2$, a Young's-modulus below about 6,000 kp/mm$^2$, a specific surface area of less than 1 m$^2$/g, and a density of about 1.70 to 2.17, and comprising by weight about 70 to 100 percent of silicon dioxide, about 0 to 20 percent of water, about 0 to 20 percent of alkoxy groups and less than about 2 percent of acid radicals other than silicate.

10. A silica gel fiber according to claim 9 having a Young's-modulus of less than about 2,500 kp/mm$^2$.

11. A process according to claim 1, wherein said poly-lower alkylene oxide is polyethylene oxide of a degree of polymerization of at least about 100,000.

* * * * *